(12) United States Patent
Li et al.

(10) Patent No.: US 11,008,021 B2
(45) Date of Patent: May 18, 2021

(54) MANUAL MODE TRAINING SYSTEM (71) Applicant: Ford Global Technologies, LLC, Dearborn, MI (US)

(72) Inventors: Yuzhou Li, Dearborn, MI (US); Grant Inskeep, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 16/461,932

(22) PCT Filed: Nov. 23, 2016

(86) PCT No.: PCT/US2016/063598
§ 371 (c)(1),
(2) Date: May 17, 2019

(87) PCT Pub. No.: WO2018/097829
PCT Pub. Date: May 31, 2008

(65) Prior Publication Data
US 2019/0300021 A1 Oct. 3, 2019

(51) Int. Cl.
*B60W 50/16* (2020.01)
*B60W 50/10* (2012.01)
(Continued)

(52) U.S. Cl.
CPC ............ *B60W 50/16* (2013.01); *B60W 50/10* (2013.01); *B60W 50/14* (2013.01); *F16H 59/0204* (2013.01); *F16H 59/18* (2013.01); *F16H 61/0213* (2013.01); *F16H 61/0248* (2013.01); *F16H 63/42* (2013.01); *B60W 2540/10* (2013.01); *B60W 2540/12* (2013.01); *B60W 2710/1005* (2013.01); *B60W 2720/10* (2013.01);
(Continued)

(58) Field of Classification Search
CPC ...... B60W 50/16; B60W 50/14; B60W 50/10; B60W 2540/10; B60W 2540/12; B60W 2710/1005; B60W 2720/10; F16H 61/0213; F16H 59/0204; F16H 59/18; F16H 61/0248; F16H 63/42; F16H 2059/003; F16H 2059/0247; F16H 2061/248; F16H 2059/666; F16H 59/54; F16H 59/58; F16H 2063/426; B60Y 2400/902
See application file for complete search history.

(56) References Cited

U.S. PATENT DOCUMENTS

9,188,223 B1* 11/2015 Seagraves ............. B60W 50/14
2012/0242465 A1* 9/2012 Murata .................... B60Q 9/00
340/407.2
(Continued)

*Primary Examiner* — Justin Holmes
(74) *Attorney, Agent, or Firm* — Brandon Hicks; Eversheds Sutherland (US) LLP (57) ABSTRACT

A manual mode training system for a vehicle having a manual transmission or a "manual mode" transmission controlled by a paddle shifter. The system includes a sensor to obtain force and position information from a foot pedal of the vehicle, and a processor to receive the information. Based on the information, the processor may predict an intended vehicle response, determine an appropriate gear to achieve the intended vehicle response, and notify a driver, through a haptic feedback mechanism, how to shift the transmission of the vehicle to reach the appropriate gear. A corresponding method is also disclosed and claimed herein.

18 Claims, 6 Drawing Sheets (51) Int. Cl.
  *F16H 61/02* (2006.01)
  *F16H 63/42* (2006.01)
  *B60W 50/14* (2020.01)
  *F16H 59/02* (2006.01)
  *F16H 59/18* (2006.01)
  *F16H 59/00* (2006.01)
  *F16H 61/24* (2006.01)
  *F16H 59/66* (2006.01)
  *F16H 59/54* (2006.01)
  *F16H 59/58* (2006.01)

(52) U.S. Cl.
  CPC ......... *B60Y 2400/902* (2013.01); *F16H 59/54* (2013.01); *F16H 59/58* (2013.01); *F16H 2059/003* (2013.01); *F16H 2059/0247* (2013.01); *F16H 2059/666* (2013.01); *F16H 2061/248* (2013.01); *F16H 2063/426* (2013.01)

(56) References Cited

U.S. PATENT DOCUMENTS

| | | | | |
|---|---|---|---|---|
| 2013/0268184 | A1* | 10/2013 | Zagorski | G08G 1/166 701/300 |
| 2014/0058654 | A1* | 2/2014 | Olsen | F16H 61/0213 701/123 |
| 2014/0318293 | A1* | 10/2014 | Nelson | B60W 50/16 74/473.3 |
| 2015/0134226 | A1* | 5/2015 | Palmer | B60W 50/14 701/101 |
| 2015/0345636 | A1* | 12/2015 | Thorausch | F16H 61/18 701/64 |
| 2015/0354701 | A1* | 12/2015 | Phatak | F16H 63/42 340/441 |
| 2016/0009175 | A1* | 1/2016 | McNew | G01C 21/3652 340/438 |
| 2016/0327151 | A1* | 11/2016 | Backes | F16H 61/0213 |
| 2016/0363213 | A1* | 12/2016 | Adames | F16H 61/0213 |

* cited by examiner

Fig. 6
MANUAL MODE TRAINING SYSTEM

BACKGROUND

Field of the Invention

This invention relates to haptic or kinesthetic feedback systems for vehicles.

Background of the Invention

Automatic transmission systems have become hugely popular due to the ease of use they provide the average driver. Despite their popularity, however, such systems suffer from inherent disadvantages; most notably, being slow to respond to changed conditions, and failing to provide direct driver control. Given the choice, these and other tradeoffs make it difficult to decide between a vehicle with an automatic transmission and one with a manual transmission.

In an effort to take advantage of the benefits of each system, Ferrari® first introduced a semi-automatic, or paddle shift, transmission system. Many other automobile manufacturers have followed suit in order to provide a better driving experience to their customers. Paddle shift transmission systems, or simply "paddle shifters," are able to provide more control and power to a driver by simulating the manual gear-selection aspects of a standard transmission in an otherwise-automatic transmission engine. As a result, even average drivers may be afforded the opportunity to extract more horsepower from a vehicle's engine.

For example, paddle shifters can facilitate a driver's ability to perform fast overtaking maneuvers, or allow the driver to select the right gear for a corner, without needing to press a clutch pedal at the same time as performing the gear change. In addition to delivering more horsepower on command, paddle shifters also make it easier for the engine to do the braking instead of the brakes, by allowing the driver to downshift the car as it approaches a red light, for example. Feats such as these are accomplished using electronic sensors, pneumatics, processors, and actuators to shift gears upon input from a driver.

Despite these advantages, however, less-savvy drivers may lack the experience and confidence needed to fully realize the benefits of a paddle shift transmission system. Accordingly, what are needed are systems and methods to improve driving accuracy using a manual or paddle shift transmission system. Ideally, such systems and methods would predict a driver's intended vehicle response and indicate to the driver proper gear shifting based on that intended response, while avoiding driver distraction.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
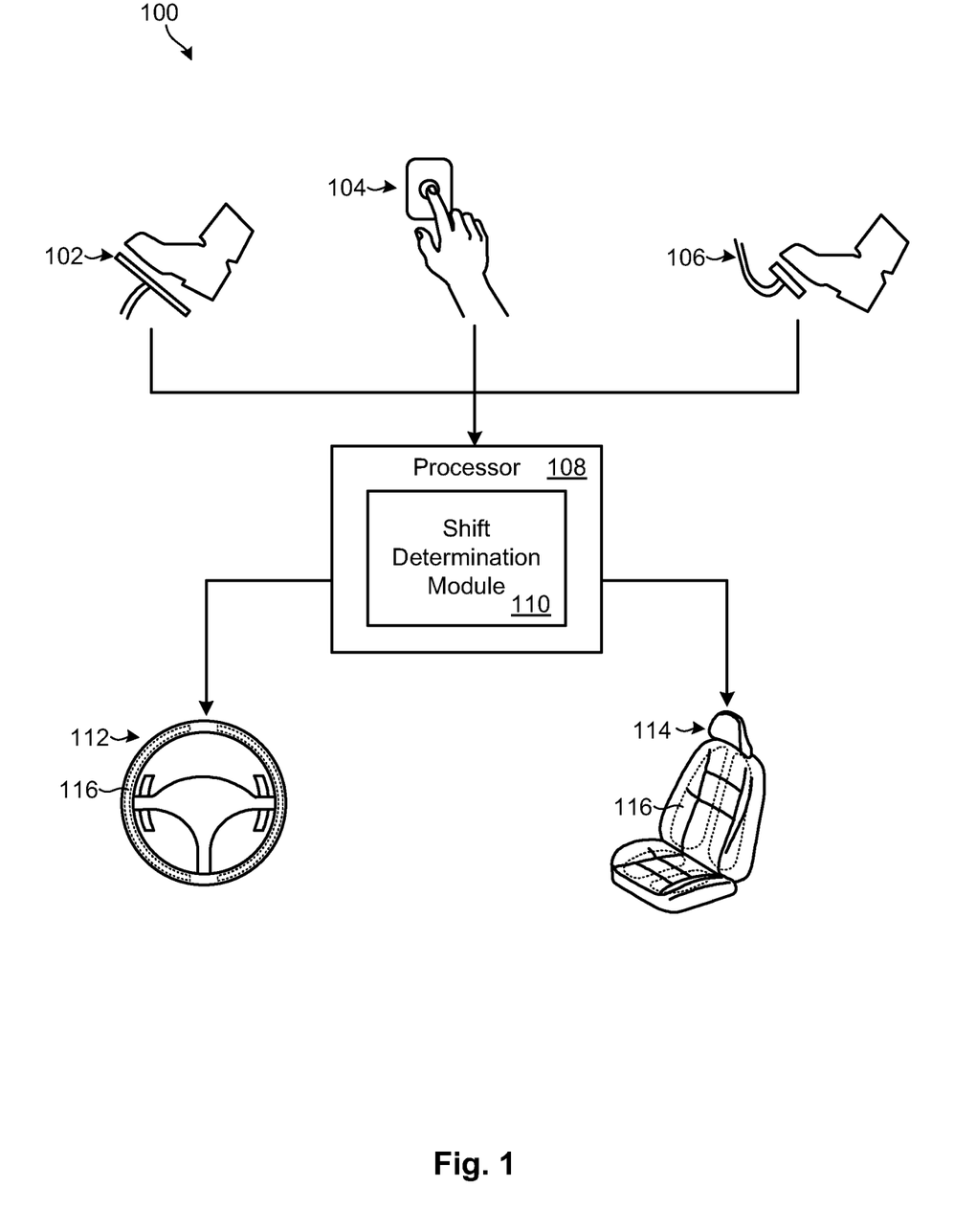
FIG. 1 is a high-level schematic diagram of one embodiment of a manual mode training system for vehicles in accordance with the invention.

Referring to FIG. 1, manual transmission engines have largely given way to automatic transmissions, due to the ease and simplicity of use they provide to the average driver. Automatic transmissions are advantageous in that they free a driver from having to shift gears manually while maneuvering the clutch. As a result, automatic transmissions are easier to use, and less manually restrictive than manual transmissions. Since automatic transmissions also greatly reduce a risk of stalling the vehicle, they are also better for hilly areas and easier to use in heavy traffic.

Despite these advantages, however, there are also disadvantages associated with vehicles with automatic transmissions. For example, automatic transmission vehicles are typically more expensive to purchase than vehicles with manual transmissions. Manual transmission vehicles may also be cheaper to maintain and offer better fuel economy. These advantages are largely due to manual transmission engines having less complexity, weighing less, and having more gears than automatics. Manual transmission vehicles are also less likely to be stolen than automatic transmission vehicles.

Arguably the biggest advantage of manual transmission vehicles, however, is the direct control they offer to the driver. While automatic transmissions are designed to select the best gear for any situation, they tend to err on the side of caution. As a result, automatics tend to shift to too high of a gear and waste engine power. There is also a delayed reaction intrinsic in automatic vehicles since they are built to respond to conditions as they occur. As a result, a driver can neither anticipate an upcoming situation, nor purposely select a lower gear for added power. Conversely, manual transmission engines allow drivers to be more or less aggressive depending on their preferences.

In order to confer many of the benefits of a manual transmissions to vehicles with automatic transmissions while still retaining the benefits of automatic transmissions, various auto manufacturers now provide a manual mode or sport mode that includes paddle shifters to give the driver more control over gear selection. Because of the tremendous popularity of automatic transmission vehicles, however, many drivers do not know how to use this functionality correctly because they are not familiar with the operation of manual transmissions, they lack education with respect to this feature, or they have not taken the time to learn the functionality. Accordingly, systems and methods of the present application are designed to teach to drivers how to more effectively utilize the "manual mode" functionality of vehicles with paddle shift transmissions.

As used herein, the term "vehicle" refers to any passenger vehicle, including a heavy-duty industrial or transport vehicle, bus, truck, car, cart, all-terrain vehicle, motorcycle, airplane, and the like. A vehicle may be gas-powered, electric, or powered by any other means known to those in the art. The terms "manual transmission" or "manual mode" are used interchangeably to refer to either vehicles built with manual transmission systems, or vehicles having automatic transmissions with manual mode functionality, or "paddle shifters".

As shown, a manual mode training system 100 in accordance with embodiments of the present invention is designed to aid a driver's ability to operate a manual transmission system, or a paddle shift transmission system where a driver can select a manual transmission mode 104. Selection of the manual transmission mode 104 may be input into a processor 108 of the vehicle. Receipt of this input may signal the vehicle processor 108 to receive and analyze other sensor data, predict an intended vehicle response, and instruct a driver on how to shift the transmission as needed to achieve the same.

The manual mode training system 100 may include accelerator pedal sensors 102 and/or brake pedal sensors 106 coupled to or integrated with an accelerator pedal and/or brake pedal of a vehicle. The accelerator pedal sensors 102 and brake pedal sensors 106 may measure a force or pressure applied to the associated pedal. The accelerator pedal sensors 102 and brake pedal sensors 106 may also measure a position or angle of the accelerator pedal or brake pedal relative to the floor of the vehicle. These measurements may be input to the vehicle processor 108 to determine a driver's targeted speed, the acceleration or deceleration needed to reach that speed, and the intended vehicle response.

For example, in one scenario, a driver may press on the accelerator hard and fast in an effort to overtake a vehicle in the neighboring lane. In another scenario, the driver may gradually press on the brake as the vehicle approaches a stop light. In either case, the accelerator pedal sensors 102 or brake pedal sensors 106 may register corresponding force and position measurements. These measurements may be input to the vehicle processor 108 and analyzed in the shift determination module 110, as discussed in more detail with reference to FIG. 5 below. The shift determination module 110 may utilize these measurements to predict the driver's intended vehicle response, and notify the driver as to how to shift the transmission gears to achieve that response. In some embodiments, the shift determination module 110 may also notify the driver of the appropriate timing for such gear shifts.

Specifically, the vehicle processor 108 may analyze measurements from the accelerator pedal sensors 102 and brake pedal sensors 106 to predict the driver's targeted speed, and to calculate the acceleration or deceleration needed to reach that speed. The vehicle processor 108 may utilize the results of these calculations to determine an appropriate, or optimal, gear the vehicle should be in. Depending on the gear that the vehicle is currently in, a shifting sequence needed to reach the appropriate gear may be determined.

The vehicle processor 108 may utilize haptic feedback to notify the driver of the recommended shifting sequence. In certain embodiments, for example, a haptic feedback device or mechanism 116 may be integrated with or coupled to a steering wheel 112 of the vehicle. In other embodiments, a haptic feedback mechanism 116 may be integrated with or coupled to a driver seat 114 of the vehicle. In response to a determination from the shift determination module 110 regarding the intended vehicle response, the vehicle processor 108 may send a signal to activate the haptic feedback mechanism 116 of the steering wheel 112 and/or driver seat 114. In some embodiments, the vehicle processor 108 may send the signal to the haptic feedback mechanism 116 more than once to indicate a corresponding number of shifts in gear necessary to achieve the intended vehicle response.

In certain embodiments, the signals sent by the vehicle processor 108 to the haptic feedback mechanism 116 may have unique characteristics to convey various discrete instructions to a driver. For example, the vehicle processor 108 may generate haptic feedback signals having varying durations, character, frequency, patterns, locations, or other characteristics known to those in the art. As discussed in more detail with reference to FIGS. 3 and 4 below, in some embodiments, the signals generated by the vehicle processor 108 may instigate haptic feedback corresponding to one portion of the steering wheel 112 to indicate a recommended upshift, and corresponding to another portion of the steering wheel 112 to indicate a recommended downshift. Likewise, haptic feedback on one portion of the driver seat 114 may indicate a recommended upshift, while haptic feedback on another portion of the driver seat 114 may indicate a recommended downshift.

Figure 2:
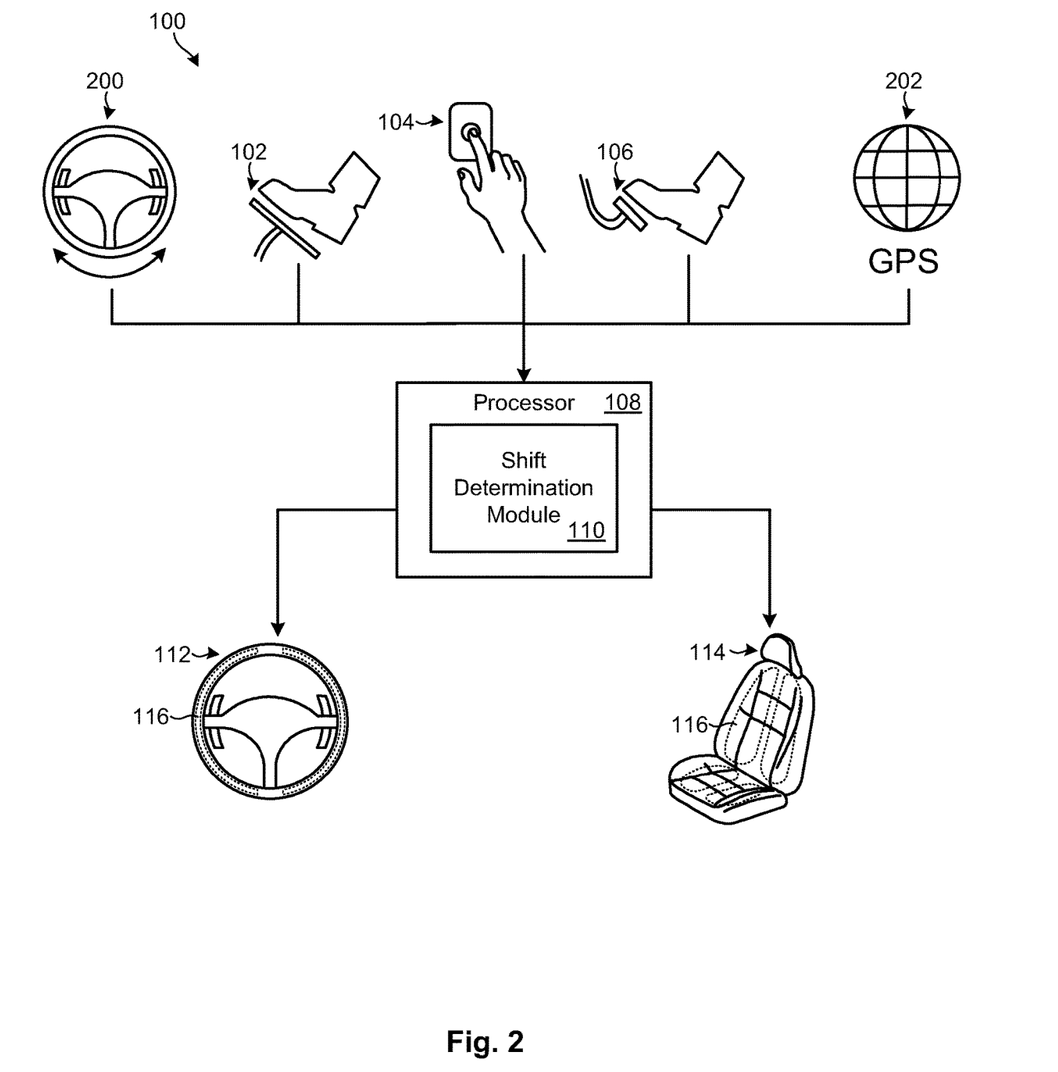
FIG. 2 is a high-level schematic diagram of a second embodiment of the manual mode training system of FIG. 1.

Referring now to FIG. 2, in certain embodiments, a manual mode training system 100 in accordance with the invention may further include a directional steering sensor 200. The directional steering sensor 200 may detect a rotational position of the steering wheel 112 and/or steering column, a speed at which the steering wheel 112 or steering column is turning, and rotational acceleration of the steering wheel 112 or steering column. These measurements may be input into the vehicle processor 108 and utilized to predict whether the driver is anticipating or maneuvering a turn. This information may then be taken into account to aid the vehicle processor 108 in determining an appropriate gear to successfully navigate the turn.

In some embodiments, the manual mode training system 100 may further include a global positioning system sensor 202. The global positioning system sensor 202 may communicate with the vehicle processor 108 to determine the location of the vehicle with respect to its surrounding environment. Particularly, the global positioning system sensor 202 may detect certain roadway conditions or features that may be pertinent to the vehicle processor's 108 ability to accurately predict a driver's intended vehicle response.

For example, in one embodiment, the global positioning system sensor 202 may determine that the vehicle is approaching a hill. This information may be input to the vehicle processor 108 in addition to input from the accelerator pedal sensors 102 indicating that the driver is actively pressing on the accelerator. Based on this input, the vehicle processor 108 may predict that the intended vehicle response is to maintain a previous speed as the vehicle traverses uphill, rather than to increase the vehicle speed. This prediction may affect the timing and number of shifts in gear that the vehicle processor 108 recommends.

In another embodiment, the global positioning system sensor 202 may detect upcoming traffic congestion. This information may be input to the vehicle processor 108 in addition to input from the brake pedal sensors 106 indicating that the brake pedal is being depressed. The vehicle processor 108 may use this input, in combination, to predict that the intended vehicle response is to gradually reduce the vehicle speed to match the speed of upcoming traffic. Without this input from the global positioning system sensor 202, the vehicle processor 108 may incorrectly predict that the intended vehicle response is to slow the vehicle to a stop.

In any case, the timing and number of gear shifts needed may differ depending on the intended vehicle response predicted by the vehicle processor 108. Accordingly, it may be highly beneficial for the vehicle processor 108 to utilize data from additional sensors, such as the directional steering sensor 200 and the global positioning system sensor 202, to determine a context in which measurements from the accelerator pedal sensors 102 and brake pedal sensors 106 are occurring. The combination of this information may then be used to determine, with as much accuracy as possible, the timing and sequence of gear shifts needed for the vehicle to achieve the intended vehicle response.

Figure 3:
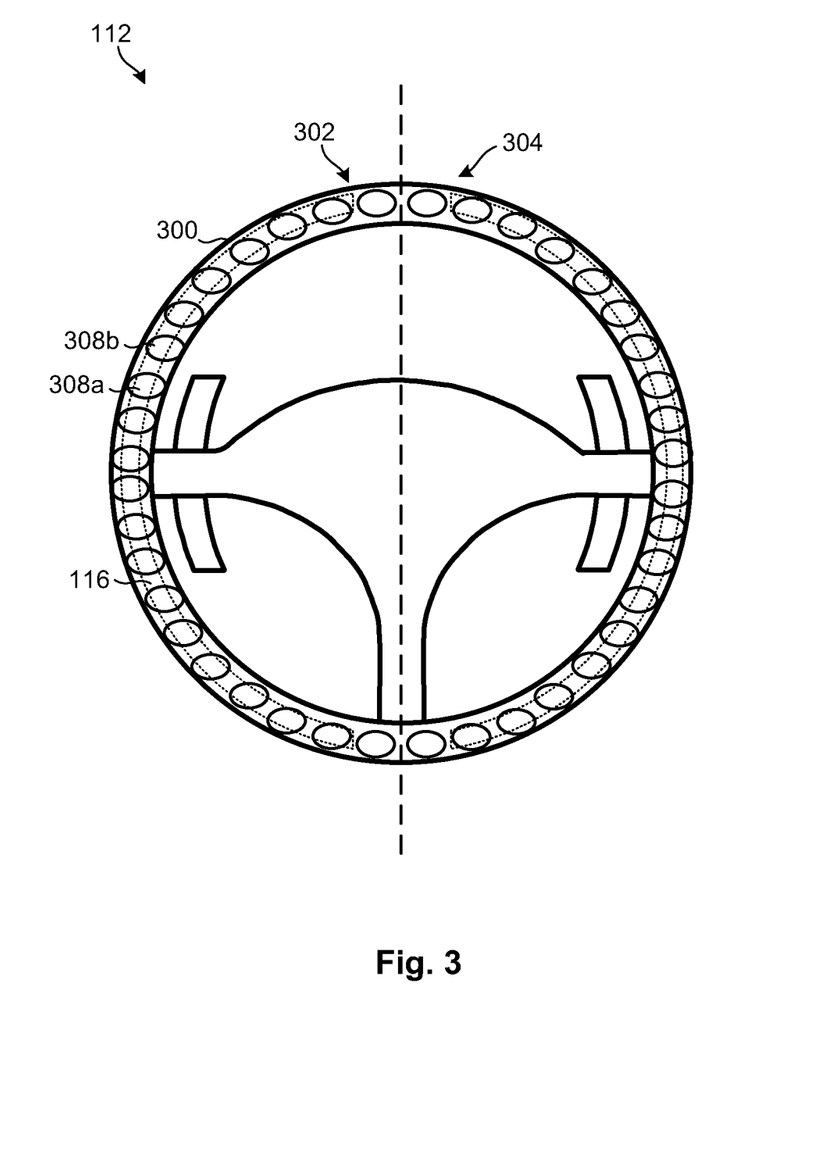
FIG. 3 is a front perspective view of a steering wheel configured to provide haptic feedback in accordance with certain embodiments of the invention.

Referring now to FIG. 3, in certain embodiments, a steering wheel 112 may incorporate one or more haptic feedback mechanisms 116 into a left hemisphere 302 and a right hemisphere 304 of its outer ring 300. The haptic feedback mechanism 116 may include entirely separate mechanisms 116 associated with each hemisphere 302, 304, or may be a unitary mechanism having one or more segments corresponding to each hemisphere 302, 304. In this manner, the vehicle processor 108 may direct discrete signals to either or both hemispheres 302, 304 as needed to convey particular instructions, via haptic feedback, to a driver. Alternatively, one or more haptic feedback mechanisms 116 may be coupled to or incorporated into the steering wheel 112 in any arrangement known to those in the art.

For example, in one embodiment, the vehicle processor 108 may direct a signal to one hemisphere 302 of the steering wheel 112 to indicate that an upshift is needed, and may direct a signal to the other hemisphere 304 to indicate that a downshift is needed. As previously mentioned, in some embodiments, the signal from the vehicle processor 108 may be repeated to indicate the number of shifts needed to achieve an appropriate gear. Each signal may be initiated at, or just prior to, a point in time at which a gear shift is needed. In this manner, a driver may be given time to react to the notification while still making the gear shift efficiently. Alternatively, the vehicle processor 108 may send the signals to the haptic feedback mechanism 116 in succession to indicate the number of gear shifts that the driver needs to make successively.

In other embodiments, the vehicle processor 108 may direct signals to both hemispheres 302, 304 of the steering wheel 112 substantially simultaneously to alert the driver that a non-compliant or mistaken gear shift has occurred, and that correction is required. This may occur, for example, when the driver does not follow the suggested number of shifts in gear, or when the driver shifts the gear in the wrong direction (i.e. shifts up when he should shift down). If the driver shifts to a completely wrong gear that is far from the appropriate gear and may be dangerous, the vehicle processor 108 may send a unique, readily identifiable, danger signal to the haptic feedback mechanisms 116. In one embodiment, for example, all haptic feedback mechanisms 116 may vibrate heavily once to indicate immediate danger.

As shown in FIG. 3, certain embodiments of a steering wheel 112 in accordance with the invention may also incorporate one or more touch detection sensors 308*a*, 308*b* in an outer ring 300 thereof. The touch detection sensors 308*a*, 308*b* may detect whether one or both of a driver's hands are in contact with the steering wheel 112, and may also detect the position of the driver's hands. This information may be communicated from the touch detection sensors 308*a*, 308*b* to the vehicle processor 108. The vehicle processor 108 may utilize this information to determine the best method by which to notify a driver of the gear shifts recommended by the manual mode training system 100.

Indeed, at times when the driver does not have both hands on either hemisphere 302, 304 of the steering wheel 112, the haptic feedback mechanism 116 on the steering wheel 112 may be inadequate to notify the driver of the recommended shifts in gear. Accordingly, the manual mode training system 100 may utilize additional or alternative haptic feedback mechanisms 116 to notify the driver of the recommended course of action.

Figure 4:
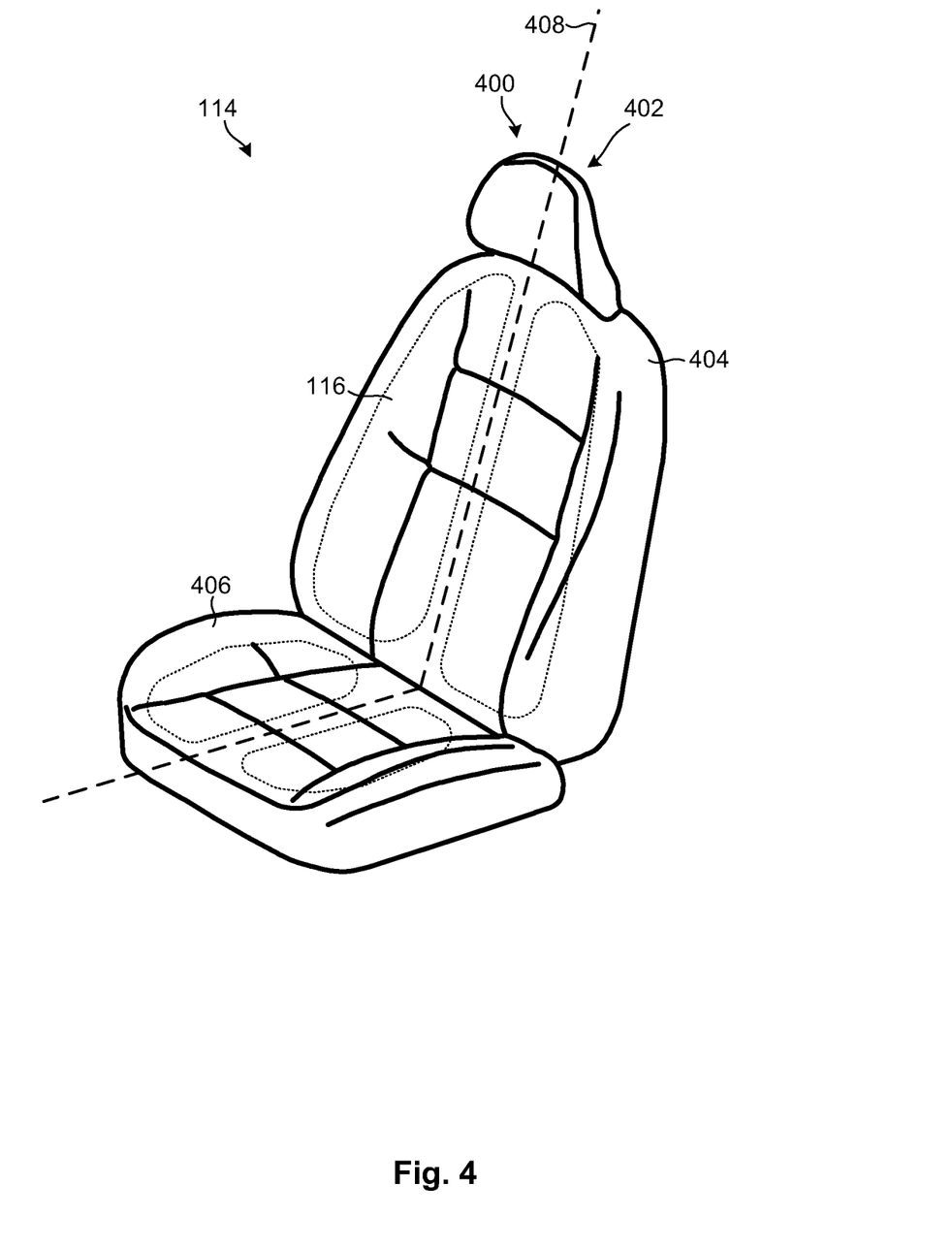
FIG. 4 is a perspective view of a vehicle driver seat configured to provide haptic feedback in accordance with certain embodiments of the invention.

In some embodiments, vibrations or other haptic feedback may be actuated in haptic feedback mechanisms 116 located in the vehicle driver seat 114 or another alternate location when the touch detection sensors 308*a*, 308*b* indicate that both of the driver's hands are not in contact with, or in acceptable positions, on the steering wheel 112. In some embodiments, alternative haptic feedback mechanisms 116 in other vehicle locations may be actuated in addition to those associated with the steering wheel 112.

As shown in FIG. 4, one or more haptic feedback mechanisms 116 may be coupled with or incorporated into a driver seat 114 of the vehicle. Haptic feedback mechanisms 116 may be integrated with a back 404 and/or bottom 406 of a driver seat 114. In one embodiment, one or more haptic feedback mechanisms 116 may be incorporated on either side 400, 402 of a midline 408 of the driver seat 114, such that haptic feedback corresponding to each side 400, 402 of the midline 408 conveys unique information.

Like the haptic feedback mechanisms 116 incorporated with either hemisphere 302, 304 of the steering wheel 112, for example, the vehicle processor 108 may send discrete signals to either side 400, 402 of the midline 408 depending on the instruction to be conveyed to the driver. In one embodiment, haptic feedback on one side of the midline 408 may indicate that an upshift is needed, while haptic feedback on the other side of the midline 408 may indicate that a downshift is needed. Haptic feedback on both sides 400, 402 of the midline 408 may indicate that there was an error in driver execution of the recommended shift pattern, or to signal immediate danger, as discussed in detail above.

Figure 5:
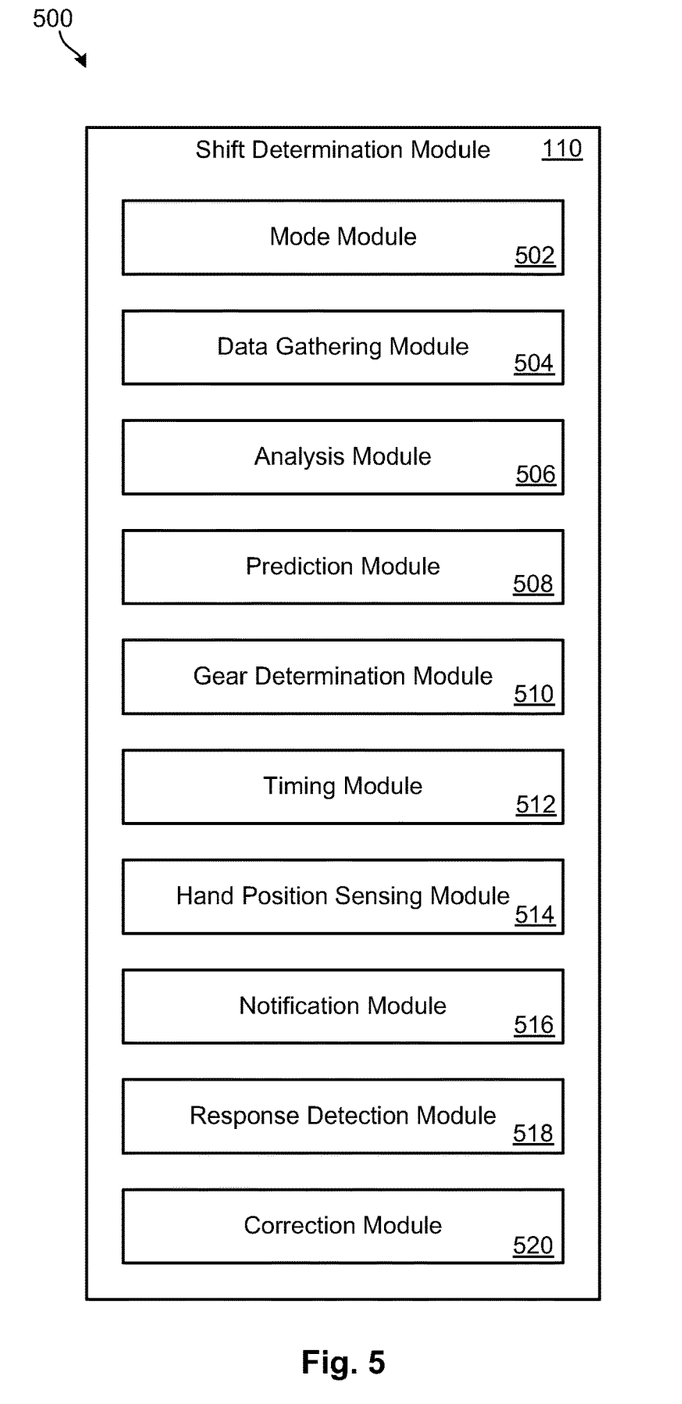
FIG. 5 is a high-level block diagram of a shift determination module in accordance with certain embodiments of the present invention.

Referring now to FIG. 5, embodiments of a vehicle processor 108 may include a shift determination module 110 to analyze input and data from the various sensors 102, 104, 106, 200, 202 to formulate predictions regarding an intended vehicle response, and to notify a driver regarding a sequence or pattern of gear shifts needed to achieve the same. To this end, the shift determination module 110 may include a mode module 502, a data gathering module 504, an analysis module 506, a prediction module 508, a gear determination module 510, a timing module 512, a hand position sensing module 514, a notification module 516, a response detection module 518, and a correction module 520.

The mode module 502 may first verify that the vehicle is operating in a manual transmission mode. Upon verification, the shift determination module 110 may proceed to analyze additional data, as set forth below.

Next, the data gathering module 504, analysis module 506, and prediction module 508 may operate together to predict an intended vehicle response. Specifically, the data gathering module 504 may collect measurement and other data and information from the accelerator pedal sensors 102, brake pedal sensors 106, directional steering sensor 200, global positioning system sensor 202, and/or touch detection sensors 308*a*, 308*b*, as discussed in detail above. The analysis module 506 may then analyze this data by inputting the data into various algorithms. The prediction module 508 may utilize the results of the analysis to predict an intended vehicle response. As discussed previously, the predicted intended vehicle response may vary depending on situational factors, such as geographic and environmental features affecting the vehicle's course of travel, as well as quantifiable measurements and other sensor data.

The gear determination module 510 may receive the predicted intended vehicle response from the prediction module 508 and, based on that prediction, determine an appropriate or optimal gear that the vehicle should reach to achieve the intended vehicle response. The gear determination module 510 may further determine a sequence or pattern of gear shifts needed to reach the appropriate or optimal gear.

The timing module 512 may receive the appropriate gear and gear sequence information from the gear determination module 510. The timing module 512 may utilize this information to determine the timing of when to send a haptic feedback signal to the haptic feedback mechanism 116. Various factors may be taken into account, including the speed of the engine, the speed of the vehicle, and driver reaction time, i.e. the amount of time it takes the driver to react to perform the shift upon receiving the haptic feedback signal. In short, the timing module 512 may determine the optimal or most efficient timing of when to shift the transmission. In some embodiments, the timing module 512 may determine the most appropriate timing for each shift needed to reach the appropriate gear. In other embodiments, the timing module 512 may determine appropriate timing for the first gear shift only.

The hand position sensing module 514 may receive data from the touch detection sensors 308a, 308b to determine whether a driver has one hand or both hands on the steering wheel 112, and to detect an associated hand position. The hand position sensing module 514 may utilize this information, in combination with information regarding the location and placement of haptic feedback mechanisms 116, to determine whether the driver's hands are positioned such that they may receive a haptic feedback signal in the form of vibrations or the like created by the haptic feedback mechanisms 116.

The notification module 516 may receive information from the other modules 502, 506, 508, 510, 512, 514 and, using that information, may notify the driver of how to shift the vehicle transmission to reach the appropriate gear. As discussed previously, the notification module 516 may send an appropriate signal to the haptic feedback mechanisms 116 in the steering wheel 112 and/or driver seat 114 to notify the driver when, and in which direction, to change gears. The notification module 516 may also notify the driver of the number of gear changes needed. This may occur by sending discrete signals to the appropriate haptic feedback mechanism 116 at the time the gear shift is needed, or by sending signals in direct succession to the haptic feedback mechanism 116, such that the number of signals corresponds to the number of gear shifts required.

The response detection module 518 may analyze a shift in gear performed by the driver to determine whether the driver complied with the action communicated to the driver by the notification module 516. If there was an error in the shift, i.e. shifting down instead of up, or shifting too soon or too late, the response detection module 518 may communicate the error to the correction module 520.

The correction module 520 may then notify the driver of the error via a signal sent to the haptic feedback mechanism 116. The correction module 520 may notify the driver of the mistake by, for example, causing the haptic feedback mechanisms 116 on both steering wheel 112 hemispheres 302, 304 to vibrate briefly. If the error is extreme or dangerous, the correction module 520 may alert the driver by, for example, causing all haptic feedback mechanisms 116 to vibrate heavily once.

Figure 6:
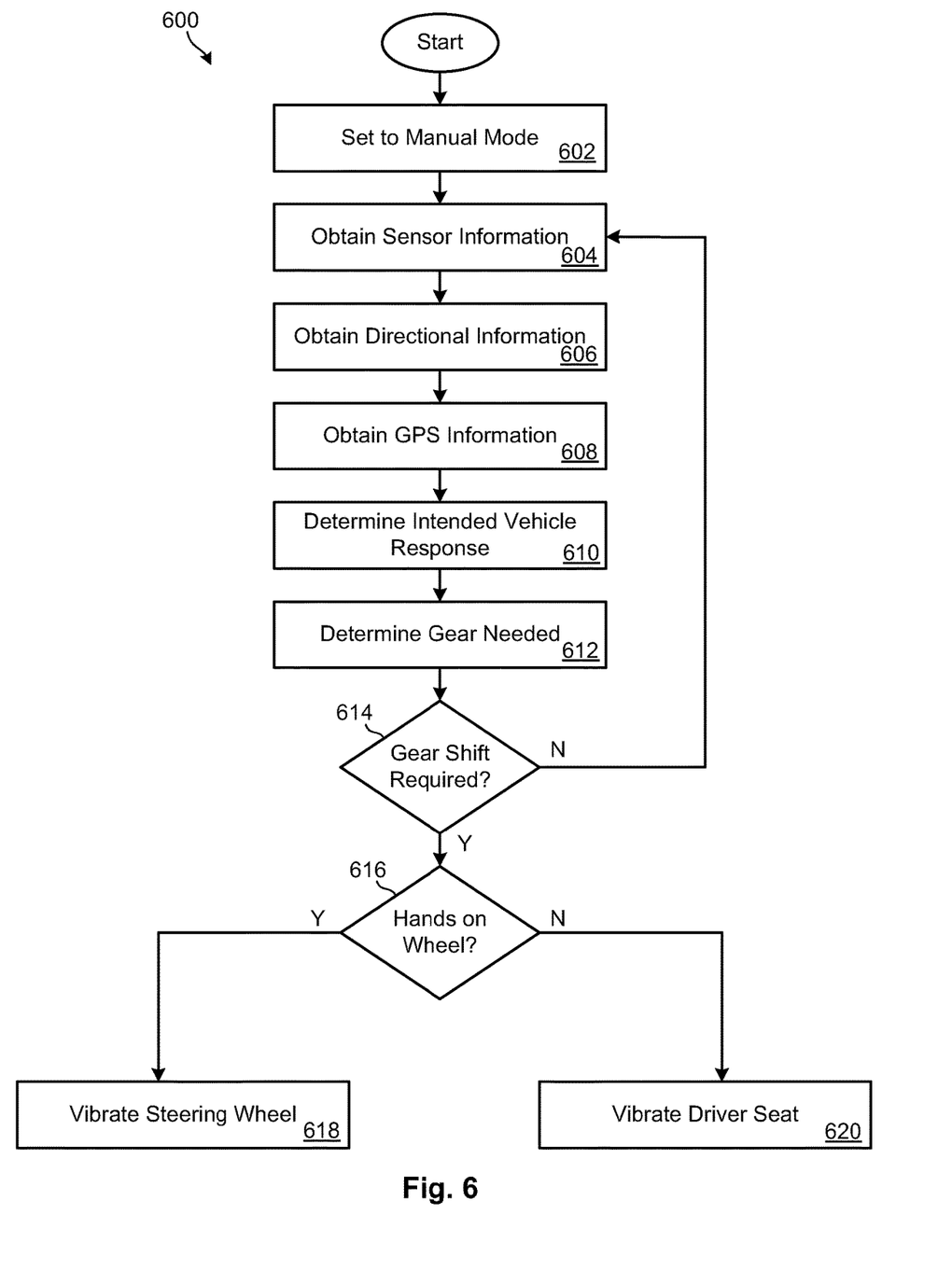
FIG. 6 is a flow chart of a method for providing manual mode training in accordance with certain embodiments of the invention.

Referring now to FIG. 6, a method 600 for training a driver to use a manual transmission system, or to use manual mode in a paddle shift transmission system, may include first setting 602 the vehicle to manual mode. Sensor information may then be obtained 604 from accelerator pedal sensors 102, brake pedal sensors 106, and the like. Sensor information may include force or pressure sensor data, as well as position or angle measurements of the accelerator or brake pedal relative to the floor of the vehicle.

In some embodiments, directional steering information from the steering wheel 112 or steering column may also be obtained 606. This information may include, for example, the rotational speed and acceleration of the steering wheel 112. These measurements may be used to predict the presence and features of an upcoming turn, such as the degree of the curve. This information may be pertinent to determining the intended vehicle response, i.e. navigating a curve, as well as to determining the gear needed to safely achieve the same.

In certain embodiments, global positioning system ("GPS") information may be obtained 608 from one or more global positioning system sensors 202. This information may further facilitate the ability to predict an intended vehicle response by taking into account geographic features of the surrounding area and upcoming roadway.

Based upon all of the information gathered, the method 600 may then determine 610 the intended vehicle response. The intended vehicle response may include, for example, a targeted vehicle speed and the acceleration or deceleration needed to reach that speed. An appropriate gear for that purpose may then be determined 612.

The method 600 may query 614 whether a gear shift is required to reach the appropriate gear. If not, the method 600 may return to obtaining 604 sensor data from the various sensors. If yes, the method 600 may query 616 whether the driver's hands are positioned such that the driver may receive a haptic feedback signal through one or more haptic feedback mechanisms 116 integrated with or coupled to the steering wheel 112. If yes, a haptic feedback signal from the vehicle processor 108 may vibrate 618 or otherwise activate the haptic feedback mechanism 116 associated with the steering wheel 112. If not, a haptic feedback signal from the vehicle processor 108 may vibrate 620 or otherwise activate a haptic feedback mechanism 116 associated with the driver seat 114. In some embodiments, vibrating 620 or activating the driver seat 114 haptic feedback mechanism 116 may also include vibrating 618 or activating the steering wheel 112 haptic feedback mechanism 116.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising:
a sensor to obtain at least one of force and position information from a foot pedal of a vehicle having a manual transmission mode; and
a processor to:
receive the information and predict an intended vehicle response;
determine an appropriate gear to achieve the intended vehicle response;

determine that at least one hand of a driver fails to hold a steering wheel of the vehicle;

determine, based on determining that the at least one hand fails to on the steering wheel, to actuate a haptic feedback through a haptic feedback mechanism in a driver seat instead of the steering wheel; and notify the driver, through the haptic feedback mechanism, how to shift a transmission of the vehicle to reach the appropriate gear.

2. The system of claim 1, wherein the sensor is one of an array of sensors coupled to the foot pedal.

3. The system of claim 1, wherein the foot pedal is one of an accelerator pedal and a brake pedal.

4. The system of claim 1, wherein the intended vehicle response comprises a targeted vehicle speed.

5. The system of claim 1, wherein the haptic feedback mechanism iteratively actuates the haptic feedback in the the driver seat, wherein a number of iterations corresponds to a number of transmission shifts needed to reach the appropriate gear.

6. The system of claim 1, wherein the haptic feedback comprises a first signal from a first location of the driver seat to indicate an upshift, and wherein the haptic feedback comprises a second signal from a second location of the driver seat to indicate a downshift, the first location being different from the second location.

7. The system of claim 1, wherein determining that the at least one hand fails to hold the steering wheel of the vehicle is via a touch detection sensor coupled to the steering wheel.

8. The system of claim 7, wherein determining to actuate the haptic feedback through the haptic feedback mechanism in the driver seat instead of the steering wheel in response to the touch detection sensor failing to detect the at least one hand.

9. The system of claim 6, wherein the processor is further configured to:

determine a wrong shift of the transmission; and send, via the haptic feedback mechanism, based on determining the wrong shift of the transmission, a third signal from a third location of the driver seat.

10. A method comprising:

obtaining, by a sensor, at least one of force and position information from a foot pedal of a vehicle having a manual transmission mode;

receiving, by a processor, the information and predicting an intended vehicle response;

determining, by the processor, an appropriate gear to achieve the intended vehicle response;

determining that at least one hand of a driver fails to hold a steering wheel of the vehicle;

determining, based on determining that the at least one hand fails to on the steering wheel, to actuate a haptic feedback through a haptic feedback mechanism in a driver seat instead of the steering wheel; and notifying, via the haptic feedback mechanism, the driver how to shift a transmission to reach the appropriate gear.

11. The method of claim 10, wherein the sensor is one of an array of sensors coupled to the foot pedal.

12. The method of claim 10, wherein the foot pedal is one of a gas pedal, an accelerator, and a brake pedal.

13. The method of claim 10, wherein the intended vehicle response comprises a targeted vehicle speed.

14. The method of claim 10, further comprising iteratively actuating, via the haptic feedback mechanism, the haptic feedback in the driver seat, wherein a number of iterations corresponds to a number of transmission shifts needed to reach the appropriate gear.

15. The method of claim 10, wherein the haptic feedback comprises a first signal from a first location of the driver seat to indicate an upshift, and wherein the haptic feedback comprises a second signal from a second location of the driver seat to indicate a downshift, the first location being different from the second location.

16. The method of claim 10, wherein determining that the at least one hand fails to hold the steering wheel is via a touch detection sensor coupled to the steering wheel.

17. The method of claim 16, wherein determining to actuate the haptic feedback through the haptic feedback mechanism in the driver seat instead of the steering wheel in response to the touch detection sensor failing to detect the at least one hand.

18. The method of claim 15, further comprising:

determining a wrong shift of the transmission; and sending, via the haptic feedback mechanism, based on determining the wrong shift of the transmission, a third signal from a third location of the driver seat.

\* \* \* \* \*